United States Patent [19]

Rayfield et al.

[11] 4,104,105

[45] Aug. 1, 1978

[54] AUTOMATIC OVERLAY ATTACHING APPARATUS

[75] Inventors: Wilson Parker Rayfield, Pittsford; Robert H. Jurgensen, Rochester, both of N.Y.

[73] Assignee: Burroughs Corporation, Detroit, Mich.

[21] Appl. No.: 736,674

[22] Filed: Oct. 28, 1976

[51] Int. Cl.$^2$ .......................... B44C 3/00; B32B 35/00

[52] U.S. Cl. .................................... 156/364; 156/541; 156/DIG. 27; 156/DIG. 33; 271/251

[58] Field of Search ................................ 156/540–542, 156/556, 362, 363, 364, DIG. 2, DIG. 27; 271/251, 253; 197/127 R

[56] References Cited

U.S. PATENT DOCUMENTS

| | | | |
|---|---|---|---|
| 2,240,424 | 4/1941 | Spiess | 271/251 |
| 3,550,933 | 12/1970 | Wilson | 271/251 |
| 3,666,262 | 5/1972 | Fowler et al. | 271/251 |
| 3,721,601 | 3/1973 | Pituch et al. | 156/541 |
| 3,729,362 | 4/1973 | French et al. | 156/363 |
| 3,803,388 | 4/1974 | Williamson et al. | 360/101 |
| 3,833,448 | 9/1974 | Gates et al. | 156/541 |
| 3,908,986 | 9/1975 | Bleau | 271/251 |
| 3,970,506 | 7/1976 | Kwan et al. | 156/364 |

*Primary Examiner*—Douglas J. Drummond
*Assistant Examiner*—Michael W. Ball
*Attorney, Agent, or Firm*—Lynn L. Augspurger; Kevin R. Peterson; Edward J. Feeney

[57] ABSTRACT

Disclosed is a label or patch overlay dispensing apparatus having a storage reel for carrying a supply tape of adhesive overlays, a feed throat for receiving a document to which an overlay is to be attached and a contact for sensing a document in the feed throat and for causing the advancement of the document to a label attaching position. The device is responsive to the receipt of the document in the overlay attaching position for releasing an overlay or patch for attachment to the document and a pressure bonder for attaching the label is activated when the overlay is removed from the supply roll. As the overlay is attached the document is concurrently ejected from the device.

7 Claims, 5 Drawing Figures

AUTOMATIC OVERLAY ATTACHING APPARATUS

BACKGROUND OF THE INVENTION

The present invention relates to patch or label attaching means for automatically, adhesively securing a label or adhesive strip of material to a document, and more particularly to negotiable instruments such as checks. In the United States MICR characters are utilized for check identification. In the course of processing checks at the bank the written amount is encoded in MICR characters, usually at the lower right hand corner of the check. Occasionally the person who encodes the amount makes a mistake. It is necessary to correct the MICR amount and for this purpose a label is attached to the check covering the erroneously encoded MICR amount. Thereafter the check can be re-encoded with the correct amount.

A primary object of the invention is to provide a label and/or patch dispenser for documents such as checks and items other than checks, as we contemplate documents such as short postcards, billing stubs, envelopes and the like may be used with the same apparatus. Such articles may be preprinted and yet have a need for attention getting label applied thereto or they may be processed like checks. The apparatus of the present invention may be used for applying a magnetic stripe by means of an adhesive patch bearing the stripe to a passbook or passport or the like.

A prior U.S. Pat. No. 3,833,448 granted Sept. 3, 1974 for, "An Apparatus for Automatically Attaching a Magnetizable, Machine Readable Stripe to a Commercial Document", assigned to the assignee of this application, and incorporated fully herein by reference, describes a manually driven apparatus for applying an overlay or patch to an item or document, such as a savings bank passbook, in which a supply of tapes or patches is applied to a document by the device which has a document receiving area adjacent to the tape supply and a document support throat into which the document is inserted and advanced and thereafter retracted and removed. A pick up reel arrangement adjacent the document receiving area is provided for advancing an individual patch from a supply of patches and over a pin where the patches are caused to detach from the supply for application to the document by means of a roller for adhering the patch to the document while simultaneously removably retracting the document from the document receiving area. In this prior art the movement of the document was controlled by the movement of a hand crank.

SUMMARY OF THE INVENTION

In accordance with the present invention there is provided a label or patch or overlay dispensing apparatus comprising a storage reel for carrying a supply tape of adhesive overlays, a feed throat for receiving a document to which an overlay is to be attached, a contact is provided for sensing a document in the feed throat and for causing the advancement of the document to a label attaching position. The device is responsive to the receipt of the document in the overlay attaching position for releasing an overlay or patch for attachment to the document and a pressure bonder for attaching the label is activated when the overlay is removed from the supply roll. As the label is attached the document is concurrently ejected from the device.

PREFERRED EMBODIMENT OF THE INVENTION

Figures 1, 2, 3, 4, 5:
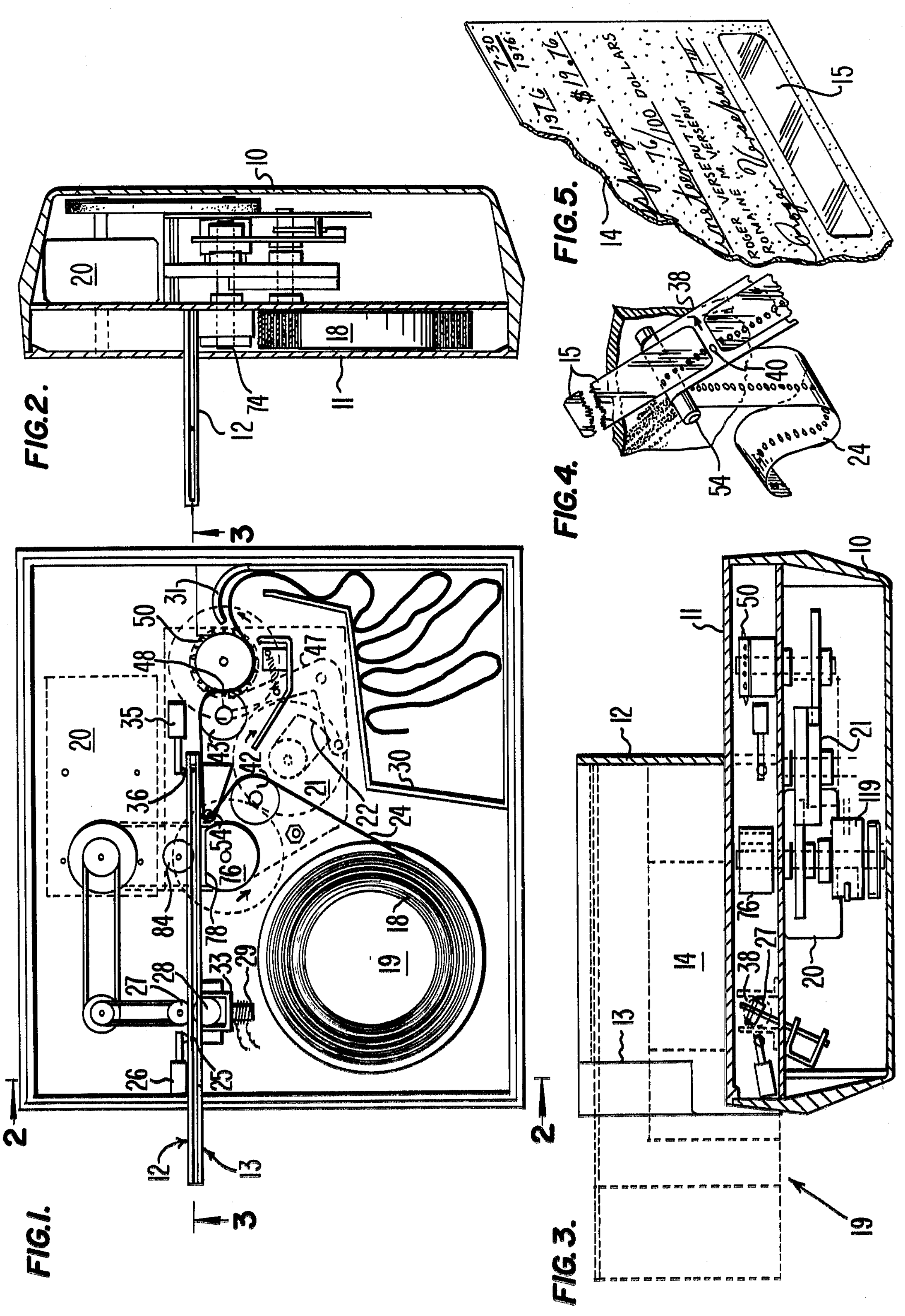
FIG. 1 is a top plan view of the dispensing device of the invention showing the document receiving throat but with portions of the cover removed to expose the internal cooperating elements.
FIG. 2 is a left side elevational view of the device of FIG. 1 taken generally along line 2—2 with portions partially broken away to expose essential internal mechanisms.
FIG. 3 is a front elevational view of the apparatus of FIG. 1 taken generally along line 3—3 and illustrating other sections of the device in greater detail.
FIG. 4 is an enlarged schematic prospective of the label stripping section shown in a mirror view.
FIG. 5 is an illustration of a check section showing the position in which a corrective overlay would normally be placed.

The preferred embodiment of the present invention as shown in one or more of the various views of the accompanying drawings has an attractive housing 10 having a cover 11 snapped thereon. The cover has a slot formed therein to permit the document throat 12 to extend above the cover. The document throat has a notch 13 cut out of one side thereof so that a document can be laid against the opposite side of the throat and more readily inserted therein by using the side extended portion of the throat as a stiffner for the document. The document is numbered 14, see FIG. 3 in which the documents are shown in various dotted line sizes, and FIG. 5 showing the edge of the document after it has been ejected from the device. Document 14 has, by placing the document within the document throat 12, an overlay or patch or label 15 automatically applied to the surface of the document.

Referring to FIG. 1 of the drawings, a roll 18 of pressure sensitive adhesive items for example covering patches or overlays 15, is positioned on a spindle mounted in the housing 10. The tape roll 18 may thus be rotatably mounted within the housing by an operator and threaded through the device as shown by the heavily drawn overlay tape 24 in FIG. 1.

Typically the supply roll of overlays or labels is a tape 24 having a release coating thereon to which are adhered a plurality of spaced $1\frac{1}{2}$ inch by $\frac{3}{8}$ inch wide dye-cut overlay patches 15. The individual patches or overlays are spaced from one another along the release paper at intervals of $\frac{1}{4}$ inch. In order to synchronize the movement of the supply roll tape with the mechanism for advancing the tape an identifying mark 38 such as an arrow may be located on the tape. This identifies one of the holes 40 in the tape located adjacent to the leading edge of the overlay 15. The tape 24 is approximately $\frac{3}{4}$ of an inch wide and it is adapted to be pin or sprocket fed in a manner to be described and to this end is provided with the holes 40 punched along the edge thereof and parallel to the longitudinal axis of the overlay patches 15, as may be seen in FIG. 4.

The overlay tape 24 is fed from the supply roll 18 to and around the polished wheel or drum 42 and bent back around a projecting peeler pin or stripper pin 54 and drawn about an idler wheel 43 by a driven sprocket wheel 50 from which it is threaded into the throat of a tape discard compartment 30 past discard throat guide 31. As the supply roll, during the process of using the device, advances through the machine, the sprocket wheel 50 forces the tape to be stuffed into the compartment 30 in the manner shown. The funnel shape of the compartment 30 forces the used tape release paper back into the compartment where it stacks or folds up.

A single motor 20 positioned within the housing 10 drives all tape drive elements. The power take off is by a pulley belt drive 63 arrangement as seen in FIGS. 1, 2 & 3.

Disposed for rotation on a horizontally projecting shaft 74 is an overlay or patch applicator attachment wheel 76 covered with a resilient material, for example, neoprene rubber, having a high friction coefficient. A flat area 78 is formed or cut from the wheel and acts among other things as a clearance cut out for the passage of an overlay 15 as it is stripped by the stripper pin 54 adjacent the attachment wheel 76. It will be appreciated that the patches or overlays lie on the inner surface of the supply roll 18 and that the illustration of FIG. 4 is a reverse or mirror image for a better understanding of the stripping action. Opposite the attachment wheel 76 is a roller 84 which provides additional backup pressure so that when the attachment wheel rotates in the counter-clockwise direction as viewed in FIG. 1, it pulls the strip overlay 15 with it and against the document in the throat 12 bearing against the roller 84.

Immediately below the gear wheel drive of the attachment wheel 76 on the shaft 74 is a one-way or Torrington clutch which effectively prevents reverse (clockwise) movement of the shaft 74. This clutch 119 thus maintains the attachment wheel 76 in the proper position at all times, the attachment wheel only rotates in the eject direction.

When a document 14 is inserted in the throat 12, by placing it against the throat through the notch 13 and moving it in a downwardly rotating direction the document will force the tip of a micro-switch sensor cone 25, extending into the throat, outwardly tripping the entry micro-switch. The entry micro-switch 26 will activate the drive and cause the O ring drive to rotate a roller pulley 27 skewed at an angle of between 20 and 30 degrees from the vertical. The skewed roller 27 acts as a drive to drive the document into the throat. By gravity feed a contact ball housed in a nonmetallic casing, such as plastic casing 33 rests against the roller position. The floor of the casing slopes downwardly toward the throat 12. The document when placed between the skewed roller and the contact ball will be driven with the rotation of the roller deep inside the throat. There a second contact cone 36 will be caused to move out of the throat when the document reaches a fully entered document overlay attaching position activating a document ready micro switch 35. The document ready 35 micro-swtich disengages the contact ball 28 by energizing solenoid 29 attracting the contact ball up and toward the rear of the plastic casing 33.

The tripping of the micro switch 35 also trips the label advance mechanism.

The label advance mechanism uses a plurality of gears.

The center gear is a split gear having one portion which includes a full complement of peripheral teeth while the other one half has half the number of teeth as its companion portion. The left gear is journaled on shaft 74 and drives the patch attacher while the right gear is journaled to drive the sprocket wheel 50. Journaled on the housing is a rocker arm 47 which is spring biased to cause a detent 48 to hold sprocket wheel 50 in a locked position. Center gear 21 bears a cam surface 22 which upon rotation of the gear causes the rocker arm 47 to rock outwardly permitting the sprocket wheel to rotate.

When the detent notch of the sprocket wheel 50 is released the sprocket wheel rotates and advances the tape.

Concurrently with the rotation of the sprocket wheel the upper portion of the center gear rotates with the gear driving the patch attacher. Thus the patch or overlay 14 is drawn away from the tape 24 after it has been peeled by the sharp bend of the tape as a result of the abrupt change of direction as it is drawn over peeler pin 54. Continued rotation of the gears causes the leading rotating edge of resilient patch attacher roller 76 to press the leading edge of the patch 14 against the wheel 84 and bond it to the document and then further rotation of the roller 76 ejects the check horizontally outward securing the patch in transit as the check is ejected from the throat area. As the check is removed the micro-switch cone 25 can return to the original start position disengaging the magnet 29 and permitting the ball to fall and rest against the skewed cam drive wheel 27. This ball 28 and the angled or skewed roller or drive wheel 27, it will be noted, keeps the check at the bottom edge of the throat by point contact. Removal of the ball by the magnet from the position in which it forces contact of the document with the roller 27 permits the check to be freely ejected as there is no contact with the ball at that time.

After the supply roll has been exhausted, the tape will have been stuffed in the compartment 30. The lid can be removed and a new supply roll inserted and the old tape thrown away.

Thus while it can be seen that this new machine utilizes parts similar to those of the earlier device described in U.S. Pat. No. 3,833,448, it will be seen that those common parts which are utilized are arranged in a new and distinct manner which is especially adapted to the automatic application of labels upon documents, stubs and the like. The mechanical handcrank operation of the earlier device has been substantially improved upon and a new modern automatic banking machine created.

While we have described our invention in its preferred embodiment in the greatest detail, it will be appreciated that those skilled in the art now and in the future may make modifications thereto without departing from the scope of the claims as amended hereto.

What is claimed is:

1. An apparatus for applying an overlay patch to a flexible item or document such as a check or deposit slip to enable correction of an encoded number and suitable for use with items of various sizes and thicknesses, comprising:

a housing, a document receiving and entry throat mounted on said housing the said throat having parallel channel guide members oriented vertically relative to a horizontal advancing path of movement of the document and for holding the document vertical during the overlay attaching and ejecting operation and having detection means for sensing the entry and presence of a document at an overlay application position in said throat, said throat further having a ball and skewed roller advancing means providing point contact with the document for driving the document into said advancing means, and having means for releasing the point contact to permit the document to be ejected from the throat, and means responsive to said detection means to cause a tape bearing an overlay patch which is to be applied to said document to advance within said housing and in said throat, and means within said housing for attaching said overlay to said document after it has been received in said throat and while simultaneously ejecting said document from said throat, and said ball and skewed roller advancing means comprises a roller skewed at an angle to the vertical so as to drive the document downwardly and horizontally along the horizontal path of movement of the document and located on one side of the document path, and a ball located on the opposite side of the document path and normally biased by gravity to roll toward and against said skewed roller or document positioned between said skewed roller and ball, said ball being metallic and housed in a nonmetallic casing having a floor sloping toward the throat such that said ball is responsive to energization of an electromagnet provided adjacent said casing for attracting the ball away from the roller or document while said document is being ejected from said throat.

2. The apparatus according to claim 1 wherein one of said vertical guide members has a notched section to permit the document to be more readily stiffened by the opposite side of the throat as it is placed in the throat of the receiving area of the document guide.

3. The apparatus according to claim 1 wherein there are means provided within said housing for adhering said overlay to the document comprising a resilient roller having a flat surface portion providing a clearance for said document as it enters said throat and a leading edge portion for attaching said overlay as it is peeled from a supply tape.

4. The apparatus according to claim 1 wherein there is provided within the housing a stuffing compartment for exhausted tape.

5. The apparatus according to claim 1 wherein there is provided within the housing, means for supporting a supply of tape bearing a plurality of overlays thereon, means for peeling said overlays from said supply roll one at a time concurrently with the receipt of the document within said throat, and for attaching the overlay, said peeling and attaching means including means responsive to the full receipt of said document for dispensing a patch to a peeled position adjacent to said document in the throat, and there is provided means for rotating a resilient roller against the overlay and document to press the overlay onto said document to attach it to said document while simultaneously ejecting the document from the apparatus.

6. The apparatus according to claim 1 wherein the skewed roller is skewed at an angle of 20° to 30° from the vertical line normal to the horizontal path of movement of the document between the parallel channel guide members.

7. The apparatus according to claim 1 wherein the overlay patch is firmly affixed to the document as said document is ejected from the throat at which time the skewed roller and ball advancing means are disengaged.

* * * * *